(12) United States Patent
Hagimura

(10) Patent No.: US 11,893,606 B2
(45) Date of Patent: Feb. 6, 2024

(54) INFORMATION PROCESSING SYSTEM

(71) Applicant: NOMURA RESEARCH INSTITUTE, LTD., Tokyo (JP)

(72) Inventor: Takuya Hagimura, Yokohama (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 0 days.

(21) Appl. No.: 17/940,131

(22) Filed: Sep. 8, 2022

(65) Prior Publication Data
US 2023/0153863 A1 May 18, 2023

(30) Foreign Application Priority Data

Nov. 12, 2021 (JP) ................................. 2021-185067

(51) Int. Cl.
*G06Q 30/0251* (2023.01)
(52) U.S. Cl.
CPC ............................... *G06Q 30/0271* (2013.01)
(58) Field of Classification Search
None
See application file for complete search history.

(56) References Cited

U.S. PATENT DOCUMENTS

| | | | | |
|---|---|---|---|---|
| 2008/0004951 A1* | 1/2008 | Huang | ................ | G06Q 30/0271 705/14.66 |
| 2015/0356662 A1* | 12/2015 | Poole | ................ | G06Q 30/0633 705/26.8 |
| 2019/0172097 A1* | 6/2019 | Cheng | ................ | G06Q 30/0261 |
| 2020/0090411 A1* | 3/2020 | Zhou | ................ | G06Q 20/3274 |

FOREIGN PATENT DOCUMENTS

JP          5713249          5/2015

OTHER PUBLICATIONS

Sara Morrison, "Why you see online ads for stuff you buy in the real world", retrieved from https://www.vox.com/recode/2019/12/19/21011527/retail-tracking-apps-wifi-bluetooth-facebook-ads, available on Jan. 29, 2020 (Year: 2020).*

* cited by examiner

*Primary Examiner* — Sam Refai
(74) *Attorney, Agent, or Firm* — RANKIN, HILL & CLARK LLP

(57) ABSTRACT

A server stores online information related to a user and transmitted and received via a communication network. The server detects a behavior of a user who came to an event venue based on data output from a sensor (for example, 3D LiDAR) installed in the event venue. The server associates the user who came to the event venue with a user whose online information is stored, based on data obtained from the behavior of the user who came to the event venue. The server executes predetermined processing with respect to the user in a case where at least one of behavior information and the online information of the user who came to the event venue satisfies a predetermined condition.

6 Claims, 7 Drawing Sheets

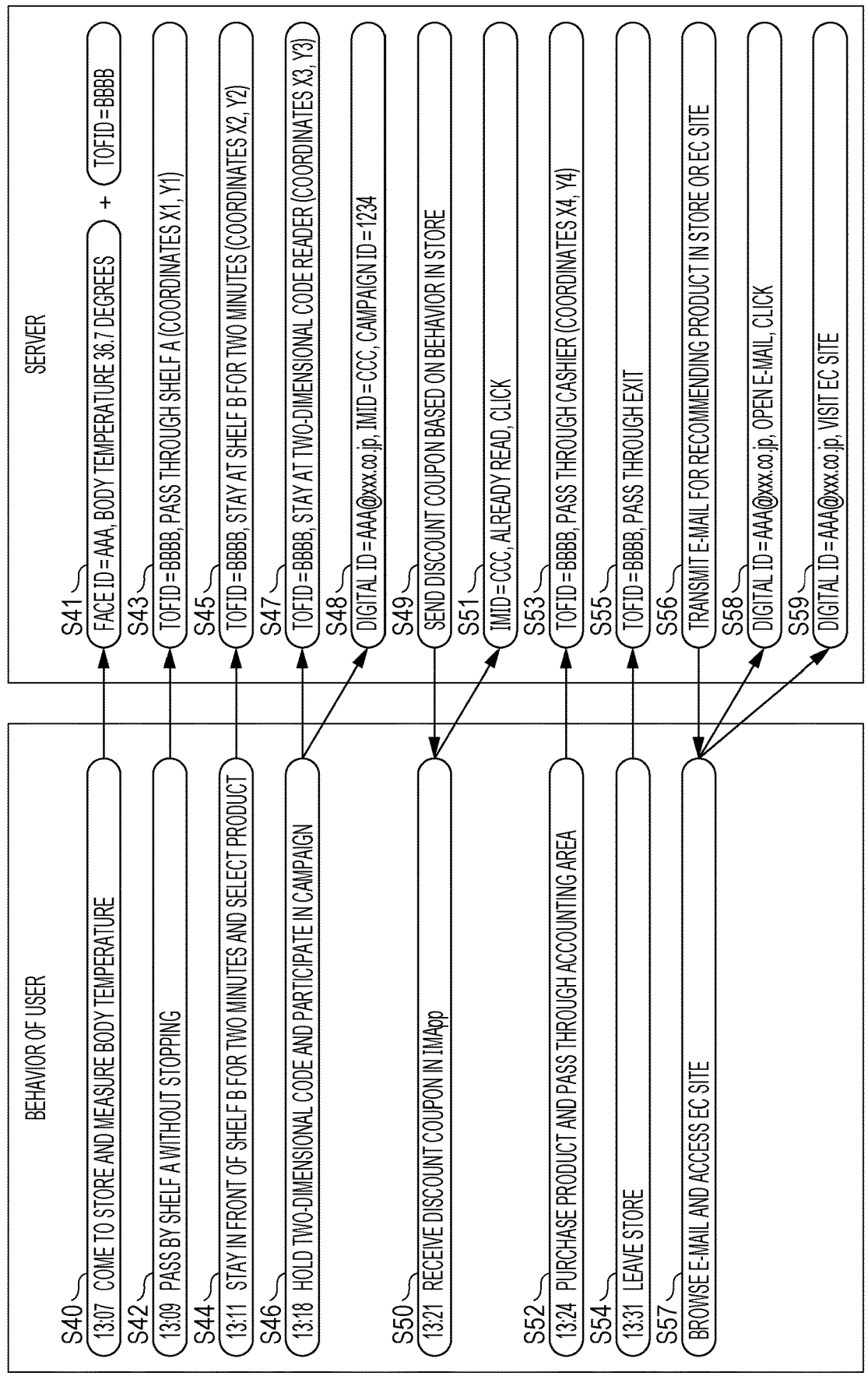

FIG. 7A

ABC SHOPPING

IS THERE PRODUCT YOU WANT? EVEN WHEN PRODUCT IS NOT IN STORE, PRODUCT POSTED ON ONLINE SHOPPING SITE "ABC SHOPPING" CAN BE ORDERED AT STORE.
PLEASE SEE SITE FROM FOLLOWING URL.
IF THERE IS PRODUCT YOU WANT, PLEASE ASK STORE STAFF.
https://www.abc.co.jp/

FIG. 7B

ABC SHOPPING

IN ADDITION TO PRODUCTS WHICH ARE AT CORNER OF ABC SHOPPING, PRODUCTS POSTED ON ONLINE SHOPPING SITE "ABC SHOPPING" CAN BE ORDERED AT STORE.
PLEASE SEE SITE FROM FOLLOWING URL.
IF THERE IS PRODUCT YOU WANT, PLEASE ASK STORE STAFF.
https://www.abc.co.jp/

FIG. 7C

ABC SHOPPING

ARE YOU LOOKING FOR BAGS AND CARRY CASES? HERE IS SPECIAL OFFER ONLY AVAILABLE TODAY!
YOU WILL RECEIVE 500 YEN DISCOUNT COUPON THAT CAN BE USED FOR PURCHASE.
PLEASE CONSIDER PURCHASE AT THIS OPPORTUNITY.

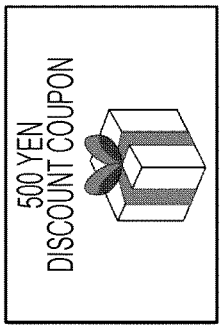

500 YEN DISCOUNT COUPON

INFORMATION PROCESSING SYSTEM

BACKGROUND

1. Field

The present disclosure relates to a data processing technology, and particularly to an information processing system.

2. Description of the Related Art

A technology in which a flow line of a user is ascertained using near field wireless communication, and a preference of the user is estimated based on a behavior history of the user is proposed (for example, refer to Japanese Patent No. 5713249).

Currently, online merges with offline (OMO) which is a marketing concept that provides a better customer experience by merging an online contact and an offline contact between a product or service provider and a customer has been proposed. In the future, improvement of customer experience utilizing OMO will be important in business.

SUMMARY

The present disclosure was made in view of such a situation, and an object of the present disclosure is to provide a technology for supporting improvement of customer experience utilizing OMO.

In order to solve the above problem, an information processing system according to an aspect of the present disclosure includes: a storage unit that stores online information related to a user and transmitted and received via a communication network; a behavior detection unit that detects a behavior of a user who came to a predetermined real space based on data output from a sensor installed in the real space; an association unit that associates the user who came to the real space with a user whose online information is stored, based on data obtained from the behavior of the user who came to the real space; and a user processing unit that executes predetermined processing with respect to the user in a case where at least one of behavior information and the online information of the user who came to the real space satisfies a predetermined condition.

Note that, any combination of the constituent elements or the expression of the present disclosure converted between devices, methods, computer programs, recording media storing computer programs, and the like are also effective as aspects of the present disclosure.

BRIEF DESCRIPTION OF THE DRAWINGS

FIG. 6 is a diagram illustrating an operation of a user and an operation of a server in an OMO system according to a second example; and FIGS. 7A, 7B, and 7C are diagrams illustrating examples of a sales promotion message.

DETAILED DESCRIPTION

The invention will now be described by reference to the preferred embodiments. This does not intend to limit the scope of the present invention, but to exemplify the invention.

A subject of a device or a method according to the present disclosure includes a computer. The computer executes a computer program to realize the functions of the subject of the device or method according to the present disclosure. The computer includes a processor that operates according to the computer program as a main hardware configuration. The type of the processor is not limited as long as the processor can realize the functions by executing the computer program. The processor includes one or more electronic circuits including a semiconductor integrated circuit (IC, LSI, and the like). The computer program is recorded in a non-transitory recording medium such as a computer-readable ROM, optical disc, or hard disk drive. The computer program may be stored in advance in a recording medium, or may be supplied to the recording medium via a wide area communication network including the Internet or the like.

In the example, an online merges with offline (OMO) system that is an information processing system that supports improvement of customer experience utilizing OMO is proposed. The OMO system associates information of online behavior and information of offline behavior about a user by associating an online ID and an offline ID of the user. The OMO system executes actions with respect to the user based on the associated online behavior and offline behavior.

The online behavior can be said to be a behavior of the user via a computer network, and includes, for example, reservation of a visit to an event venue, browsing of an electronic commerce (EC) site, an online material request, participation in a campaign, and the like. The offline behavior can be said to be a behavior of the user in the real space, and includes, for example, behavior/movement in an event venue, face authentication, body temperature measurement, and the like.

In the following first example, a pattern of associating a user who came to an event venue with an online user based on a result of face authentication (for example, collation with pre-registration data) of a user who came to the event venue as a predetermined real space will be described. In the second example, a pattern of associating a user who visited a store with an online user based on a behavior of the user who visited the store as a predetermined real space (specifically, participation in a campaign by presenting a two-dimensional code) will be described.

First Example

Figure 1:
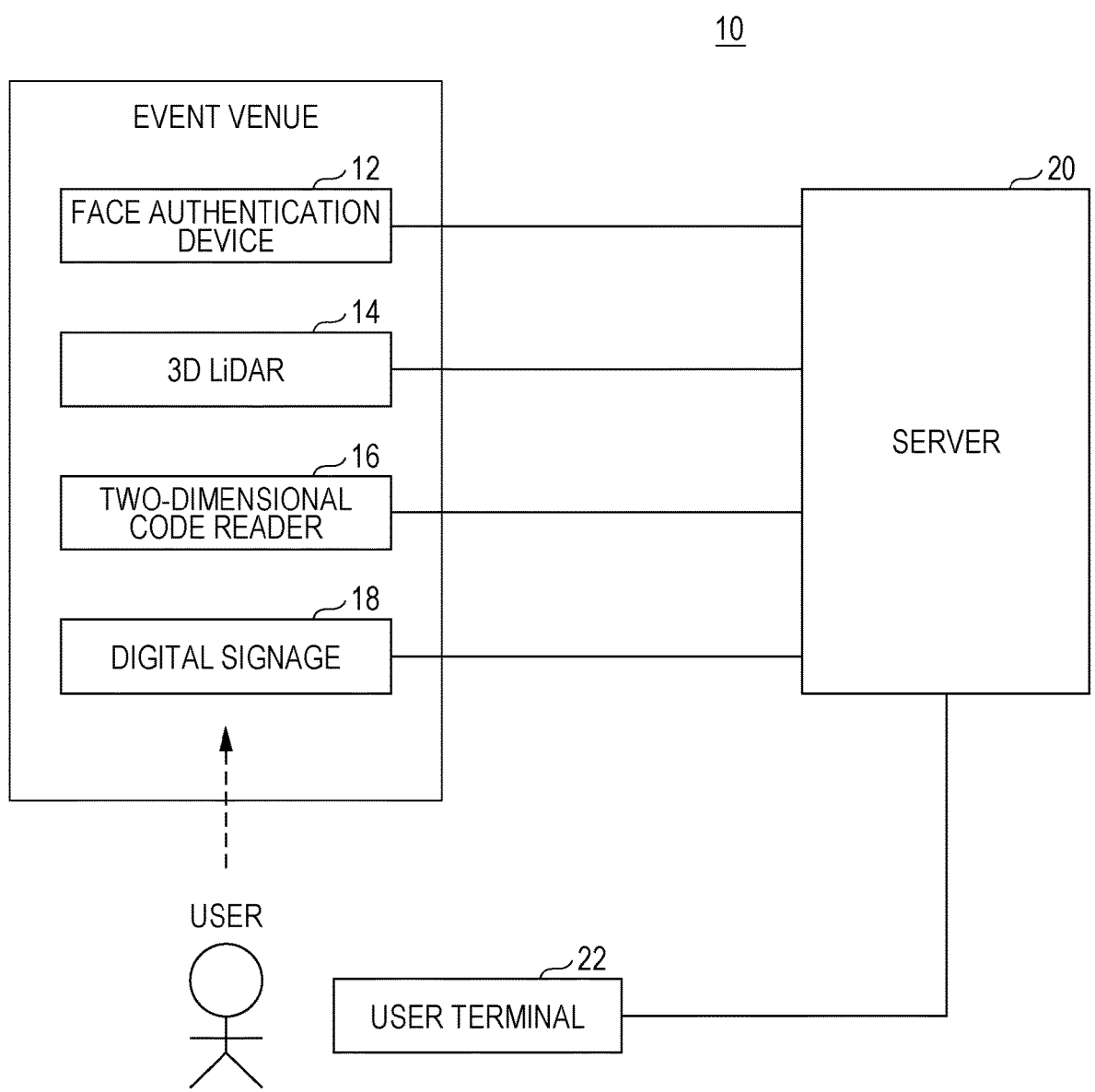
FIG. 1 is a diagram illustrating a configuration of an OMO system according to a first example.

FIG. 1 illustrates a configuration of an OMO system 10 according to a first example. The OMO system 10 includes a face authentication device 12, a 3D LiDAR 14, a two-dimensional code reader 16, and a digital signage 18 which are installed in an event venue where an exhibition is held, and a server 20 installed in a data center or the like. The server 20 communicates with each device in the event venue via a communication network including a LAN, a WAN, the Internet, and the like.

The face authentication device 12 includes an imaging unit that captures an image of a person's face, and authenticates the imaging subject based on imaging data of the face of the imaging subject. The 3D LiDAR 14 is also referred to as a 3D distance sensor device, and includes a time of flight (TOF) sensor. The 3D LiDAR 14 measures a change (this can be said to be a trajectory of movement or a flow line) in the position of each person at the event venue. The two-dimensional code reader 16 analyzes the two-dimensional code presented on a reading unit, and transmits data indicated by the two-dimensional code to the server 20. The digital signage 18 displays the information provided from the server 20 on a display unit.

The server 20 is an information processing device that executes data processing for the OMO. In the first example, the server 20 manages both the information on the online behavior and the information on the offline behavior of each user who comes to the event venue. A detailed configuration of the server 20 will be described later.

A user terminal 22 is a mobile terminal carried by a user who comes to an event venue and operated by the user. For example, the user terminal 22 may be a smartphone or a tablet terminal. The user terminal 22 communicates with the server 20 via a network such as the Internet.

Figure 2:
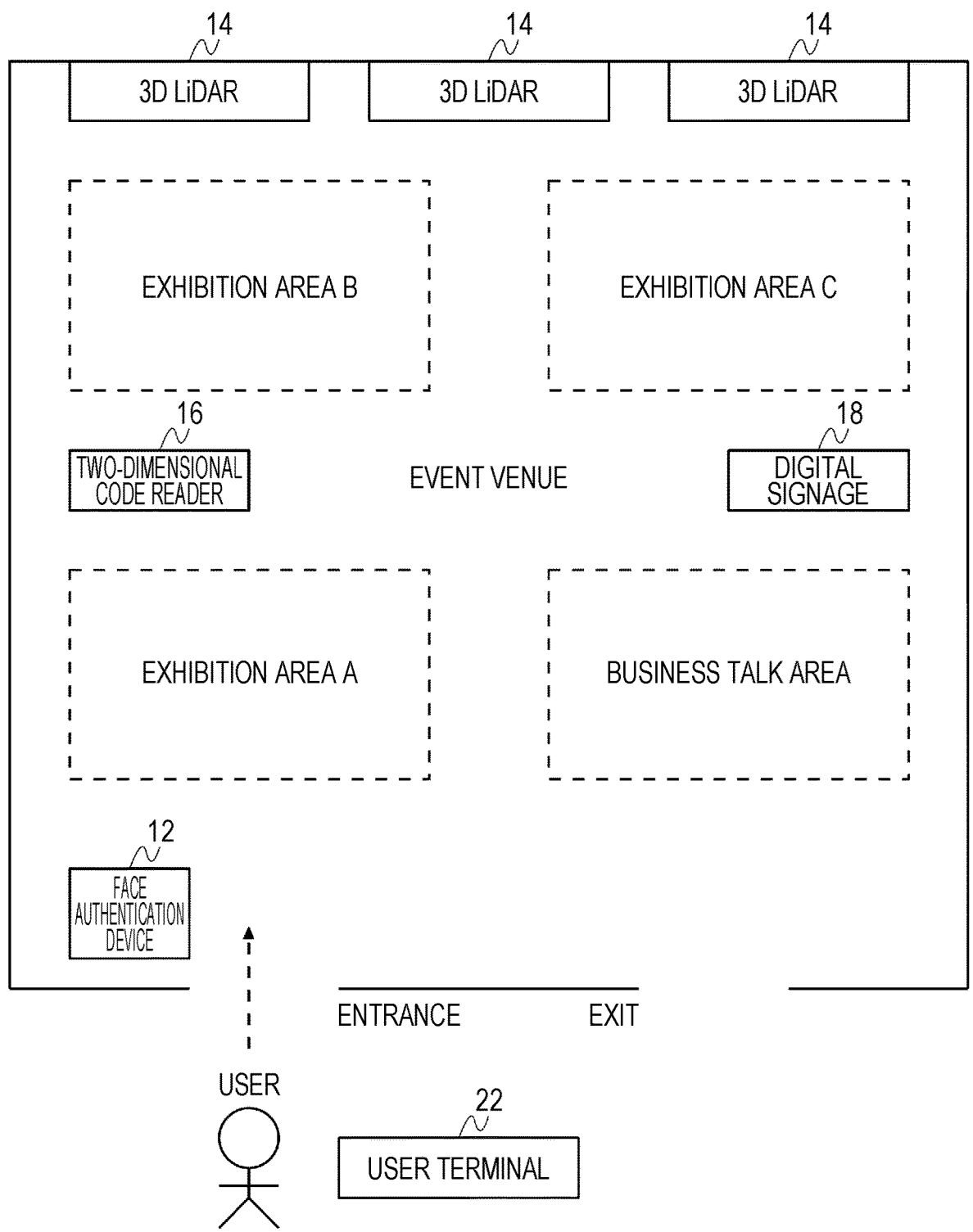
FIG. 2 is a diagram illustrating an example of an event venue.

FIG. 2 illustrates an example of the event venue. In the event venue, an exhibition area A, an exhibition area B, an exhibition area C, and a business talk area are provided. The face authentication device 12 is installed at the entrance of the event venue. When entering the event venue, the user is required to perform face authentication with the face authentication device 12. Further, a plurality of 3D LiDARs 14 are installed in the event venue, and the flow line of the user from the entrance to the exit of the event venue is measured.

Figure 3:
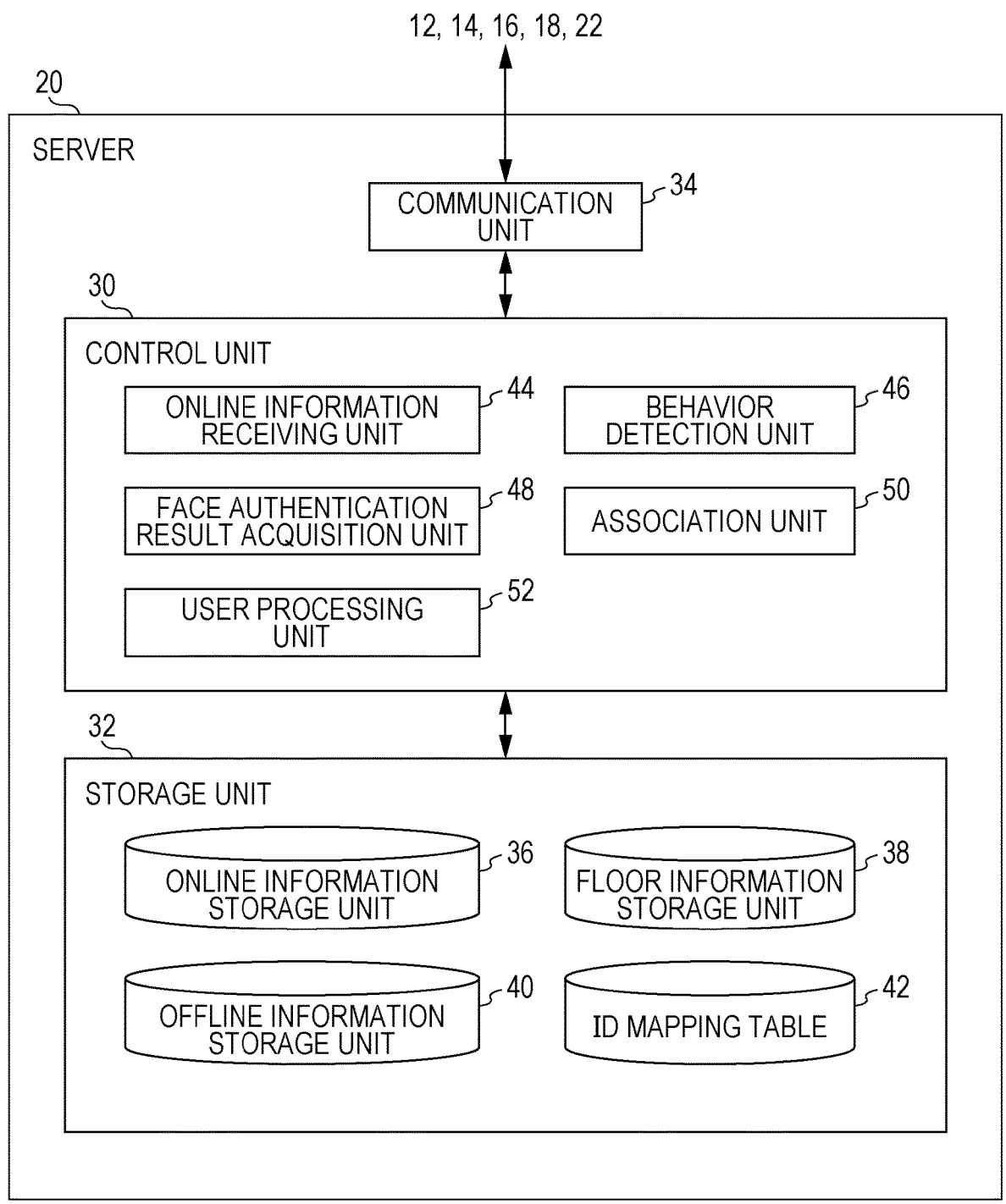
FIG. 3 is a block diagram illustrating a functional block of a server in FIG. 1.

FIG. 3 is a block diagram illustrating a functional block of the server 20 in FIG. 1. In terms of hardware, each block illustrated in the block diagram of the present specification can be realized by a processor (CPU and the like) of a computer, elements or electronic circuits including a memory, and a mechanical device. In terms of software, each block can be realized by a computer program and the like. Here, the diagram depicts functional blocks to be realized by cooperation therebetween. Therefore, those skilled in the art will understand that these functional blocks can be realized in various forms by a combination of the hardware and software.

The server 20 includes a control unit 30, a storage unit 32, and a communication unit 34. The control unit 30 executes various types of data processing. The storage unit 32 stores data to be referred to or updated by the control unit 30. The communication unit 34 communicates with an external device according to a predetermined communication protocol. For example, the control unit 30 transmits and receives data to and from each device in the event venue and the user terminal 22 via the communication unit 34.

The storage unit 32 includes an online information storage unit 36, a floor information storage unit 38, an offline information storage unit 40, and an ID mapping table 42.

The online information storage unit 36 stores online information related to each of a plurality of users and transmitted and received via a communication network. The online information includes the information regarding the online behavior described above, and also includes data pre-registered by the user who comes to the event venue. Specifically, the online information may include a digital ID, a face ID, an email address, a face image, an ID of an instant message application, data related to a material request by the user, data related to a campaign in which the user participated, and the like. The digital ID can also be referred to as an ID of the user online, and in the example, an email address of the user is set.

The floor information storage unit 38 stores information (hereinafter referred to as "floor information") regarding a floor layout of a predetermined real space (an event venue in the first example) which the user visits. The floor information includes a correspondence relationship between a plurality of areas (exhibition area A, exhibition area B, and the like) provided in the event venue and a position (coordinate data in the first example) in the event venue.

The offline information storage unit 40 stores offline information that is information regarding the offline behavior. The offline information of the first example includes information indicating behavior of each of the plurality of users who came to the event venue, and specifically includes flow line data of each user in the event venue. The flow line data is data indicating a change in the position of each user in time series from the entrance to the exit of the event venue of each user. The flow line data of each user includes a TOFID (flow line ID) and a plurality of pieces of coordinate data in time series (a set of a time stamp and coordinate data).

The ID mapping table 42 stores a correspondence relationship between the online ID and the offline ID related to the same user. For example, the ID mapping table 42 stores the digital ID as an online ID of a certain user and the TOFID as an offline ID of the user in association with each other.

The control unit 30 includes an online information receiving unit 44, a behavior detection unit 46, a face authentication result acquisition unit 48, an association unit 50, and a user processing unit 52. A computer program in which the functions of the plurality of functional blocks are implemented may be installed in a storage (the storage unit 32 or the like) of the server 20. The control unit 30 may be realized by a processor (CPU or the like) of the server 20. The processor of the server 20 may exhibit the functions of the plurality of functional blocks by reading the computer program into the main memory and executing the computer program. The functions of the plurality of functional blocks illustrated in FIG. 3 may be implemented in one computer or may be implemented in a distributed manner in a plurality of computers.

The online information receiving unit 44 receives the online information related to the user and transmitted and received via the communication network, and stores the received online information in the online information storage unit 36.

The behavior detection unit 46 detects a behavior of each user who came to the event venue based on data output from a sensor (the 3D LiDAR 14 in the first example) installed in the event venue. In the first example, the behavior detection unit 46 generates flow line data of each user who came to the event venue, and stores the flow line data of each user in the offline information storage unit 40.

The face authentication result acquisition unit 48 acquires data indicating a result of face authentication by the face authentication device 12 installed in the event venue.

The association unit 50 associates the user who came to the event venue with the user whose online information is stored in the online information storage unit 36, based on data obtained from the behavior of the user who came to the event venue. The behavior of the user in the first example is a behavior for face authentication, and is, for example, a behavior for causing the face authentication device 12 to capture an image of the user's own face. In the first example, when data (including the face ID of the user) indicating that the face authentication of a certain user is successful is received from the face authentication device 12, the association unit 50 stores the digital ID of the user associated with the face ID and the TOFID of the user existing in the position of the face authentication device 12 in the ID mapping table 42 in association with each other.

With respect to the user (here, referred to as a "target user") who came to the event venue, in a case where at least one of the behavior information of the target user at the event venue and the online information of the target user satisfies a predetermined condition, the user processing unit 52 executes predetermined processing on the target user. The behavior information of the target user at the event venue includes flow line data of the target user stored in the offline information storage unit 40. The online information of the target user includes the online information of the target user stored in the online information storage unit 36.

As processing for the target user, the user processing unit 52 may transmit introduction information or sales promotion information regarding a product or a service, in which the target user expressed an interest, to the user terminal 22 of the target user. Furthermore, in a case where the behavior detection unit 46 detects that the position of the target user is in the vicinity of the digital signage 18 of the event venue, the user processing unit 52 may transmit the introduction information or the sales promotion information to the digital signage 18 to display the information. This supports improvement of user experience.

The operation of the OMO system 10 having the above-described configuration will be described.

Figure 4:
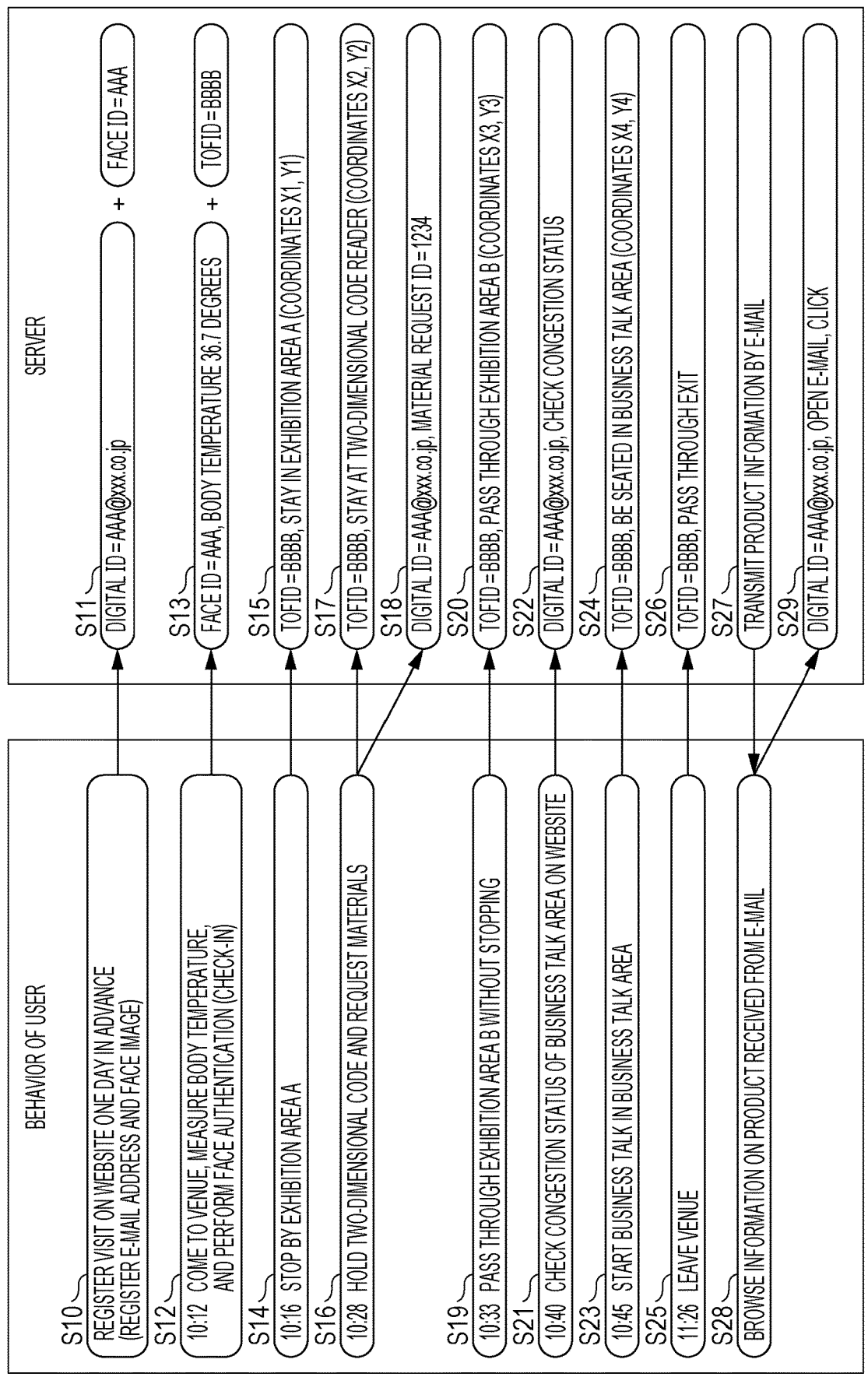
FIG. 4 is a diagram illustrating an operation of a user and an operation of a server in the OMO system according to the first example.

FIG. 4 illustrates an operation of the user and an operation of the server 20 in the OMO system 10 according to the first example. On the day before the user comes to the event venue where the exhibition is held, the user accesses the website of the exhibition using the user terminal 22 and registers the visit. In this example, the user terminal 22 transmits the email address and the face image of the user to the server 20 as pre-registration data according to the operation of the user (S10). As will be described later, the face image is used for authentication of the user at the event venue.

The online information receiving unit 44 of the server 20 receives the pre-registration data transmitted from the user terminal 22, and assigns the digital ID and the face ID of the user. An email address of the user is set as the digital ID in the first example. The online information receiving unit 44 stores the online information in which the digital ID, the face ID, and the face image of the user are associated in the online information storage unit 36 (S11). Further, a transmitting unit (not illustrated) of the server 20 transmits a set of the face ID and the face image of the user to the face authentication device 12 and stores the set.

The next day, the user enters the event venue. The user checks in by causing the face authentication device 12 installed at the entrance of the event venue to capture an image of the user's own face (S12). The 3D LiDAR 14 in the event venue detects that the user entered the event venue, and assigns a new TOFID (here, "BBBB") to the user. The 3D LiDAR 14 starts measuring the position of the user (TOFID=BBBB), and sequentially transmits measured data (including time stamps) to the server 20. The behavior detection unit 46 of the server 20 detects a flow line of the user (TOFID=BBBB) in the event venue based on the measurement data transmitted from the 3D LiDAR 14, and stores the flow line of the user in the offline information storage unit 40.

The face authentication device 12 at the event venue captures an image of the face of the user to acquire the face image of the user, and measures the body temperature of the user. The face authentication device 12 collates the face image of the visiting user captured by the imaging unit with the face image of the pre-registered user provided in advance from the server 20, and determines that the authentication of the visiting user is successful when both the features are consistent. The face authentication device 12 notifies the server 20 of a set of the time stamp and the face ID and the body temperature of the user who was successfully authenticated.

The face authentication result acquisition unit 48 of the server 20 acquires the authentication result (in the first example, data of the time stamp and the face ID and the body temperature of a visitor who was successfully authenticated) of the user at the event venue transmitted from the face authentication device 12. The face authentication result acquisition unit 48 stores the data of the time stamp, and the face ID and the body temperature of the visitor who was successfully authenticated, in the offline information storage unit 40.

The association unit 50 of the server 20 associates the user who came to the event space with the user whose online information is stored, based on the authentication result of the user at the event venue. In the example of FIG. 4, the association unit 50 associates the face ID of the user who was successfully authenticated, the digital ID associated with the face ID in advance, and the ID (TOFID=BBBB) of the flow line indicating the position of the face authentication device 12 based on the time stamp, and stores the associated IDs in the ID mapping table 42 (S13). For example, in a case where the difference between the value of the time stamp of the authentication result indicating successful authentication and the value of the time stamp of the flow line data indicating the position of the face authentication device 12 is less than a predetermined threshold value (for example, less than 5 seconds), the association unit 50 may associate the face ID (and the digital ID associated therewith) of the authentication result with the TOFID of the flow line data. At this point, the user who came to the event venue is associated with the user whose online information is stored.

The user who completed the face authentication first stops by the exhibition area A (S14). The behavior detection unit 46 of the server 20 stores the flow line data indicating that the user of TOFID=BBBB stays in the exhibition area A in the offline information storage unit 40 based on the measurement data of the 3D LiDAR 14 and the floor information (S15). For example, regarding the behavior detection unit 46, in a case where the position (coordinate value) of the user of TOFID=BBBB indicated by the measurement data of the 3D LiDAR 14 corresponds to the range of the exhibition area A indicated by the floor information and stays in the range of the exhibition area A for a predetermined time or more (for example, 2 minutes or more), the behavior detection unit 46 may determine that the user of TOFID=BBBB stays in the exhibition area A.

The user then moves to the place of the two-dimensional code reader 16. The user displays the two-dimensional code on the user terminal 22, holds the two-dimensional code over the two-dimensional code reader 16, and requests materials for a desired product or service (S16). The behavior detection unit 46 of the server 20 stores the flow line data indicating that the user of TOFID=BBBB stays in the place of the two-dimensional code reader 16 in the offline information storage unit 40 based on the measurement data of the 3D LiDAR 14 and the floor information (S17).

The two-dimensional code displayed on the user terminal 22 may be a two-dimensional code provided from the server 20 at the time of registration of visit in S10, or may be a code of the digital ID of the user and the target of the material request. The two-dimensional code reader 16 transmits, to the server 20, the digital ID of the user indicated by the two-dimensional code and data indicating the target of the material request. The online information receiving unit 44 of the server 20 receives the transmission data from the two-dimensional code reader 16, and stores data related to the material request (for example, the material request ID=1234) in the online information storage unit 36 in association with the digital ID of the user (S18).

Next, the user does not express an interest in the exhibition area B and passes through the exhibition area B without stopping (S19). The behavior detection unit 46 of the server 20 stores the flow line data indicating that the user of TOFID=BBBB passes through the exhibition area B in the offline information storage unit 40 based on the measurement data of the 3D LiDAR 14 and the floor information (S20). For example, in a case where the time during which the position (coordinate value) of the user of TOFID=BBBB indicated by the measurement data of the 3D LiDAR 14 stays in the range of the exhibition area B indicated by the floor information is less than a predetermined time (for example, less than 2 minutes), the behavior detection unit 46 may determine that the user of TOFID=BBBB passed through the exhibition area B.

Next, the user accesses the website of the exhibition using the user terminal 22 and checks the congestion status of the business talk area (S21). The online information receiving unit 44 of the server 20 stores information indicating that the user checked the congestion status in the online information storage unit 36 in association with the digital ID of the user (S22).

Next, the user starts a business talk with the person in charge of the exhibition participating company in the business talk area (S23). The behavior detection unit 46 of the server 20 stores the flow line data indicating that the user of TOFID=BBBB is seated in the business talk area in the offline information storage unit 40 based on the measurement data of the 3D LiDAR 14 and the floor information (S24).

After the business talk ends, the user leaves from the exit of the event venue (S25). The behavior detection unit 46 of the server 20 stores the flow line data indicating that the user of TOFID=BBBB passes through the exit in the offline information storage unit 40 based on the measurement data of the 3D LiDAR 14 and the floor information (S26).

The user processing unit 52 of the server 20 transmits, as a dynamic offer based on the behavior measurement, an email including information on the product in which the user expressed an interest in the event venue on the day on which the user visited the event venue, an advertisement, or materials, to the user terminal 22 (S27). For example, the user processing unit 52 may extract the digital ID associated with the TOFID in the ID mapping table 42 (that is, the ID of the user who visited the event venue), and transmit, to the user terminal 22, the information on the product for which materials indicated by the online information using the digital ID as a key is requested.

Furthermore, the user processing unit 52 may transmit, to the user terminal 22 of the user, sales promotion data suitable for the offline behavior information (that is, the behavior content in the event space) of the user who visited the event space among a plurality of types of sales promotion data stored in advance, based on the online information associated with the user. For example, the user processing unit 52 may refer to the flow line data of the user identified by TOFID=BBBB, and transmit the sales promotion data related to the product exhibited in the exhibition area where the user stayed for a predetermined time or more to the user terminal 22 of the user using the email address indicated by the online information of the user.

The user activates the mailer on the user terminal 22 and browses the product information transmitted from the server 20 (S28). The online information receiving unit 44 of the server 20 stores information indicating that the email was opened and that the link to the product information was clicked in the online information storage unit 36 in association with the digital ID of the user (S29).

According to the OMO system 10 of the first example, information on online behavior and information on offline behavior of a user who came to the event venue are associated with each other based on the result of face authentication at the event venue. As a result, it is possible to provide the user who visited the event venue with useful information suitable for one or both of the online behavior and the offline behavior of the user.

Second Example

A second example of the present disclosure will be described focusing on differences from the first example, and description of common points will be omitted. It is needless to say that the characteristics of the second example can be combined with the characteristics of the first example and the characteristics of the modification example in any manner. Among the constituent elements of the second example, constituent elements that are the same as or correspond to the constituent elements of the first example will be appropriately denoted by the same reference numerals and described.

In the second example, the user visits the store. The OMO system 10 according to the second example includes the 3D LiDAR 14, the two-dimensional code reader 16, the digital signage 18, and a temperature measuring device 24 which are installed in a store, and the server 20 installed in a data center or the like. The server 20 communicates with each device at the store via a communication network including a LAN, a WAN, the Internet, and the like.

Figure 5:
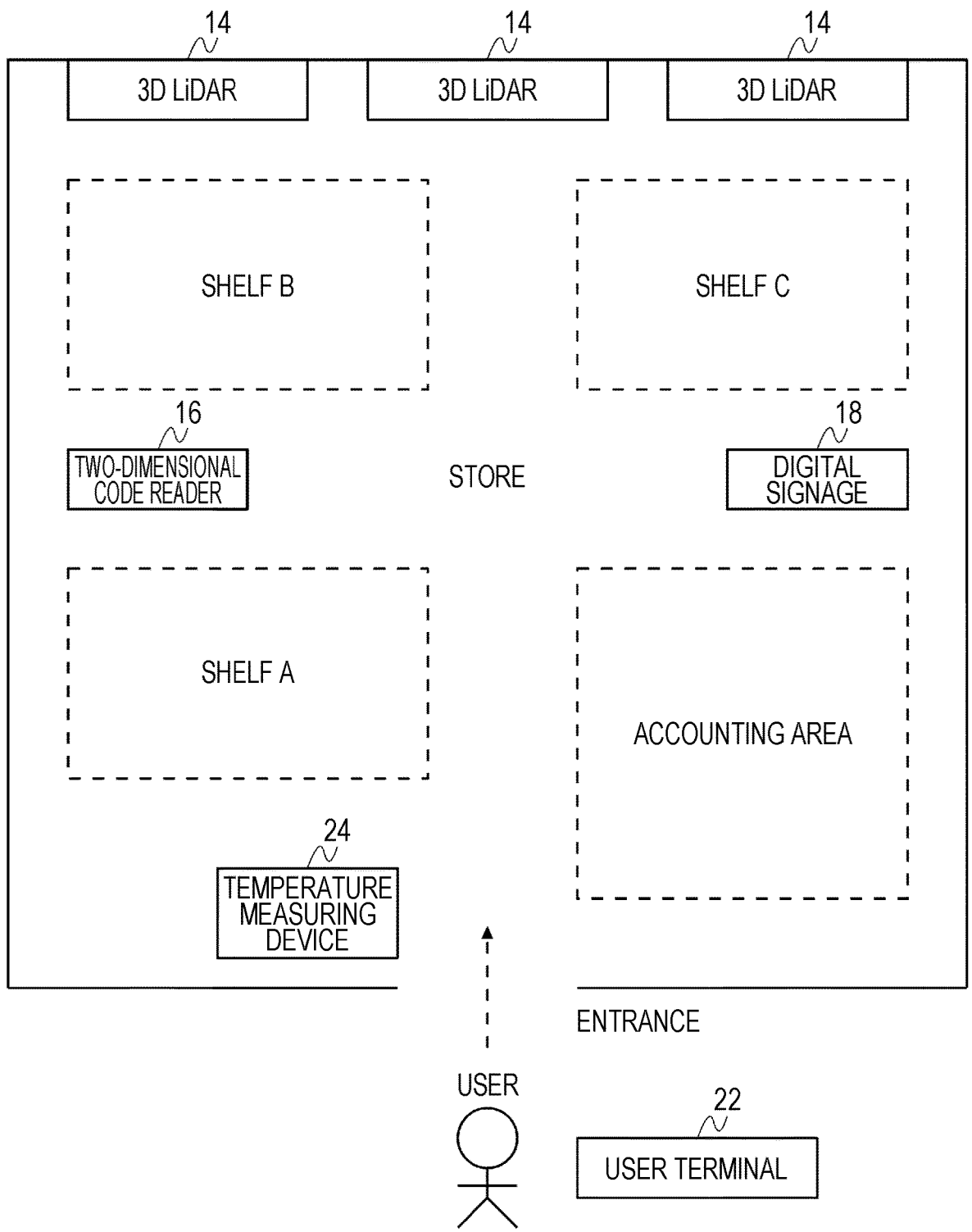
FIG. 5 is a diagram illustrating an example of a store.

FIG. 5 illustrates an example of a store. The temperature measuring device 24 is installed at the entrance of the store. The temperature measuring device 24 has a function of capturing an image of a person's face and a function of measuring a body temperature of the person, but does not have a face authentication function. The store is provided with a shelf A, a shelf B, a shelf C, and an accounting area in which a cashier is installed.

The functional blocks included in the server 20 according to the second example are similar to the functional blocks included in the server 20 according to the first example illustrated in FIG. 3. However, the server 20 of the second example includes a temperature measurement data acquisition unit (not illustrated) instead of the face authentication result acquisition unit 48.

In a case where predetermined data is received from a device (the two-dimensional code reader 16 in the second example) installed at the store due to the behavior of the user who visited the store, the association unit 50 of the server 20 generates online information based on the data. The association unit 50 associates the generated online information with behavior information of the user who visited the store (for example, flow line data at the store). The user processing unit 52 of the server 20 transmits, to the terminal of the user, sales promotion data suitable for the behavior (for example, offline behavior) of the user who visited the store among a plurality of types of sales promotion data based on the online information associated with the user.

The operation of the OMO system 10 having the above-described configuration will be described.

FIG. 6 illustrates an operation of the user and an operation of the server 20 in the OMO system 10 according to the second example. The user enters the store and causes the temperature measuring device 24 to image the user's own face (S40). The temperature measuring device 24 captures an image of the user's face, acquires a face image, and assigns a face ID. At the same time, the temperature measuring device 24 measures the body temperature of the user. The temperature measuring device 24 notifies the server 20 of a set of the face ID, the face image, and the body temperature of the user.

The temperature measurement data acquisition unit of the server 20 acquires the temperature measurement result (in the second example, data of a face ID, a face image, and a body temperature of a store visitor) at the store transmitted from the temperature measuring device 24. The temperature measurement data acquisition unit stores data of the face ID, the face image, and the body temperature of the store visitor in the offline information storage unit 40.

The 3D LiDAR 14 of the store detects that the user entered the store, and assigns a TOFID (here, "BBBB") to the user. The 3D LiDAR 14 starts measuring the position of the user (TOFID=BBBB), and sequentially transmits measured data to the server 20. The behavior detection unit 46 of the server 20 detects a flow line of the user (TOFID=BBBB) in the store based on the measurement data transmitted from the 3D LiDAR 14, and stores the flow line data of the user in the offline information storage unit 40 (S41).

The user who finished the temperature measurement passes by the shelf A without stopping (S42). The behavior detection unit 46 of the server 20 stores the flow line data indicating that the user of TOFID=BBBB passes through the shelf A in the offline information storage unit 40 based on the measurement data of the 3D LiDAR 14 and the floor information (S43).

Next, the user stays in front of the shelf B for two minutes and selects a product (S44). The behavior detection unit 46 of the server 20 stores the flow line data indicating that the user of TOFID=BBBB stays at the shelf B in the offline information storage unit 40 based on the measurement data of the 3D LiDAR 14 and the floor information (S45).

The user then moves to the place of the two-dimensional code reader 16. The user displays the two-dimensional code on the user terminal 22, holds the two-dimensional code over the two-dimensional code reader 16, and registers participation in the campaign (S46). The behavior detection unit 46 of the server 20 stores the flow line data indicating that the user of TOFID=BBBB stays in the place of the two-dimensional code reader 16 in the offline information storage unit 40 based on the measurement data of the 3D LiDAR 14 and the floor information (S47).

The two-dimensional code displayed on the user terminal 22 is provided as a bonus from an EC site of the store when the friend registration of the EC site of the store is performed in the instant message application (hereinafter, also referred to as "IMApp") installed in the user terminal 22. This two-dimensional code is obtained by coding an email address of the user, an ID of the IMApp (hereinafter, "IMID"), and a campaign ID.

The two-dimensional code reader 16 transmits campaign participation data including an email address, an IMID, and a campaign ID of the user indicated by the two-dimensional code to the server 20. The association unit 50 of the server 20 receives the campaign participation data, and sets the email address of the user as the digital ID of the user. The online information receiving unit 44 stores the online information including the digital ID, the IMID, and the campaign ID of the user in the online information storage unit 36 (S48).

In addition, when receiving the campaign participation data from the two-dimensional code reader 16, the association unit 50 refers to the flow line data (including the time stamp and the coordinates) stored in the offline information storage unit 40 to identify the flow line staying at the position of the two-dimensional code reader 16. The association unit 50 stores the ID (here, TOFID=BBBB) of the flow line staying at the position of the two-dimensional code reader 16 and the digital ID of the user in the ID mapping table 42 in association with each other. At this point, the user who visited the store is associated with the user whose online information is stored.

The user processing unit 52 of the server 20 identifies an in-store behavior of the user based on the flow line data stored in the online information receiving unit 44. For example, the user processing unit 52 may identify the total stay time at the store, the stay time at each shelf, the characteristic of the shape of the flow line, and the like as the in-store behavior of the user. In a case where the in-store behavior of the user satisfies a predetermined condition, the user processing unit 52 immediately transmits, as a real-time offer, a sales promotion message (instant message in the second example) suitable for the in-store behavior of the user to the user terminal 22 of the user.

In the second example, the sales promotion message is an instant message, and the user processing unit 52 transmits the sales promotion message to the IMApp of the user terminal 22 using the IMID of the user stored in the online information storage unit 36. The IMApp of the user terminal 22 causes the display unit to display the sales promotion message transmitted from the server 20.

FIG. 7 illustrates an example of the sales promotion message. A message 60 illustrated in FIG. 7A is a sales promotion message provided to the user on condition that the user stays in the store for 20 minutes or more. The message 60 is about introducing an EC site to a user who searched for a desired product in the store but could not find the product.

A message 62 illustrated in FIG. 7B is a sales promotion message provided to the user on condition that the user stays in front of the shelf A (shelf on which products of ABC shopping are displayed) for 30 seconds or more. The message 62 is about indicating that products other than the products displayed on the shelf A can be ordered, to the user who expressed an interest in the products of ABC shopping.

A message 64 illustrated in FIG. 7C is a sales promotion message provided to the user on condition that the user stays in front of the shelf B (a shelf on which bags and carry cases are displayed) for 20 seconds or more. The message 64 is about providing a discount coupon to the user who is considering whether or not to purchase a bag or a carry case at the store and urging the user to make a purchase.

In the example of FIG. 6, it is assumed that the user stays in front of the shelf B (a shelf on which bags and carry cases are displayed) for 20 seconds or more. The user processing unit 52 transmits the sales promotion message including the discount coupon illustrated in FIG. 7C to the user terminal 22 (S49). The user activates the IMApp on the user terminal 22 and receives a discount coupon (S50). The online information receiving unit 44 of the server 20 stores information indicating that the user read the sales promotion message and acquired the coupon in the online information storage unit 36, in association with the digital ID and the IMID of the user (S51).

The user selects a desired product from the shelf B and purchases the product using the distributed discount coupon. Then, the user passes through the accounting area (S52). The behavior detection unit 46 of the server 20 stores the flow line data indicating that the user of TOFID=BBBB passes through the accounting area in the offline information storage unit 40 based on the measurement data of the 3D LiDAR 14 and the floor information (S53).

After purchasing the product, the user leaves the store (S54). The behavior detection unit 46 of the server 20 stores the flow line data indicating that the user of TOFID=BBBB passes through the entrance/exit of the store in the offline information storage unit 40 based on the measurement data of the 3D LiDAR 14 and the floor information (S55).

Although not illustrated in FIG. 6, in a case where the user browses the EC site using the user terminal 22 in the store or outside the store, the online information receiving unit 44 of the server 20 stores the information on the web page or the product browsed by the user in association with the digital ID of the user in the online information storage unit 36. As described above, in the OMO system 10, the online behavior of the user is also recorded and accumulated in real time.

As the dynamic offer based on the behavior measurement, the user processing unit 52 of the server 20 transmits, to the user terminal 22 of the user, an email with a content of recommending a product or an EC site suitable for the online behavior and the offline behavior of the user based on the online information and the offline information of the user (S56). For example, the user processing unit 52 may transmit an email including information regarding the product browsed by the user on the EC site and/or information regarding a product displayed on the shelf at which the user stayed for a predetermined time or more at the store.

The user browses the email and accesses the EC site (S57). The online information receiving unit 44 of the server 20 stores the online information indicating that the email was opened and that the link to the EC site was clicked and the EC site was accessed in the online information storage unit 36 in association with the digital ID of the user (S58, S59).

According to the OMO system 10 of the second example, information on the online behavior and information on the offline behavior of the user who visited the store are associated with each other based on the behavior of the user at the store for participating in the campaign. As a result, it is possible to provide the user who visited the store with useful information suitable for one or both of the online behavior and the offline behavior of the user.

The present disclosure was described above based on the first example and the second example. It is understood by those skilled in the art that contents described in each example are examples, that various modification examples can be made to the combination of constituent elements or processing processes of each example, and that such modification examples are also within the scope of the present disclosure.

In the above examples, the real-time offer or the dynamic offer for the user who visited the event venue or the store is transmitted to the user terminal 22. As a modification example, in a case where it is determined that the user exists in front of the digital signage 18 based on the flow line data, the user processing unit 52 of the server 20 may cause the digital signage 18 to display the content of the offer to the user.

As another modification example, the user processing unit 52 of the server 20 may transmit information for instructing to serve the user to the terminal of the staff at the event venue or the store based on one or both of the online information and the offline information of the user. For example, in a case where the purchase amount on the EC site recorded in the online information of the user is a predetermined amount or more, the user processing unit 52 may transmit the current position of the user recorded in the offline information (flow line data) of the user and information for instructing to provide special treatment to the user, to the terminal of the store staff.

In the above example, the behavior (such as a flow line) of the user in the real space is acquired using the 3D LiDAR 14. However, as a modification example, the behavior (such as a flow line) of the user in the real space may be acquired using an AI camera or a beacon.

Combinations of any of the examples and modification examples described above are also useful as embodiments of the present disclosure. New embodiments resulting from the combination combine the effects of each of the combined examples and modification examples. Further, it should be understood by those skilled in the art that the functions to be fulfilled by the constituent elements described in the claims are realized by individual constituent elements or by cooperation of the constituent elements described in the examples and modification examples.

What is claimed is:

1. An information processing system comprising:
a storage unit that stores online information related to a user and transmitted and received via a communication network, the online information including a digital ID and a face image of the user in association with each other;
a face authentication device installed in a predetermined real space and configured to capture an image of a face of the user, collate the captured image with the face image included in the online information stored in the storage unit, and determine that a face authentication of the user is successful when both features in the captured image and the face image included in the online information are consistent;
a behavior detection unit that detects a behavior of a user who came to the predetermined real space based on flow line data detected by a sensor installed in the real space, the flow line data including a flow line ID, a position of the user based on coordinate data detected by the sensor and a time period for which the user stays in a predetermined area;
an association unit that associates the user who came to the real space with a user whose online information is stored, based on data obtained from an action of the user performed in the real space; and
a user processing unit that executes predetermined processing with respect to the user based on the detected behavior of the user and the online information of the user who came to the real space, the predetermined processing including at least one of the following:

transmitting introduction information or sales promotion information regarding a product or a service to a user terminal of the user by using the digital ID as a destination address;

transmitting the introduction information or the sales promotion information regarding the product or the service to a digital signage in a vicinity of the position of the user; or transmitting a current position of the user acquired by the sensor and information for instructing to provide special treatment to the user to a terminal of a store staff, wherein the association unit, upon receiving data indicating that the face authentication is successful from the face authentication device, associates the digital ID, which is associated with the face image, with the flow line ID.

2. The information processing system according to claim 1, wherein the online information further includes data used for authentication of the user in the real space, and the association unit associates the user who came to the real space with the user whose online information is stored, based on an authentication result of the user in the real space.

3. The information processing system according to claim 1, wherein the association unit generates the online information based on data received from a device installed in the real space due to the action of the user performed in the real space, and associates the generated online information with the detected behavior of the user who came to the real space.

4. The information processing system according to claim 1, wherein the user processing unit transmits the sales promotion information suitable for the detected behavior of the user in the real space among a plurality of types of sales promotion information to the user terminal based on the online information associated with the user.

5. The information processing system according to claim 1, wherein the information processing system further comprises an online information receiving unit that receives the online information related to the user via the communication network, and the online information receiving unit receives an online behavior of the user performed at the real space and stores the online behavior in association with the digital ID in the storage unit.

6. The information processing system according to claim 1, wherein the predetermined processing is transmitting the current position of the user acquired by the sensor to a terminal of a store staff and information for instructing to provide special treatment to the user to the terminal of the store staff.

* * * * *